Patented Aug. 12, 1947

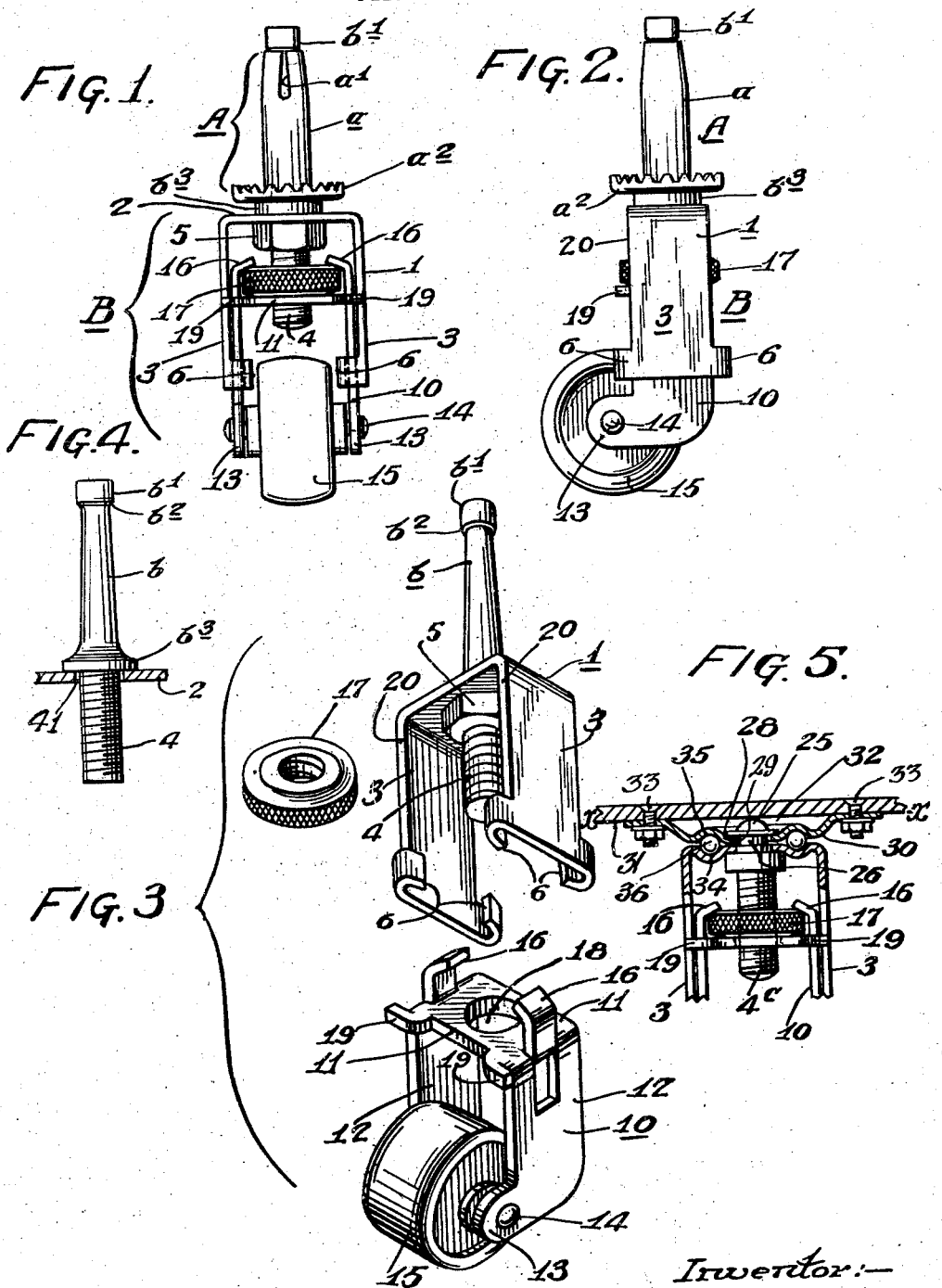

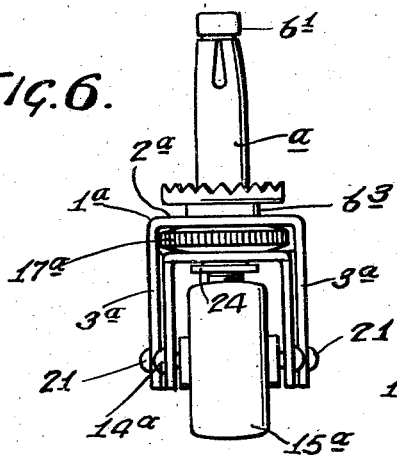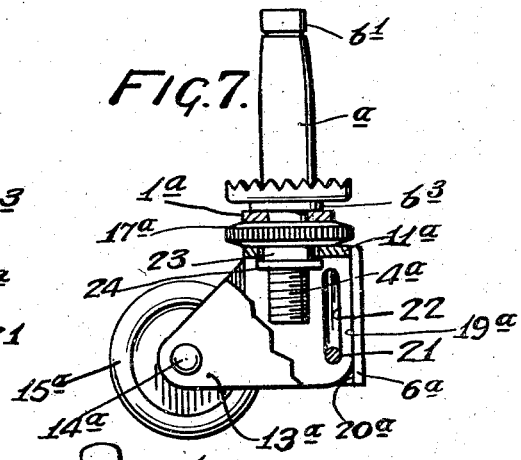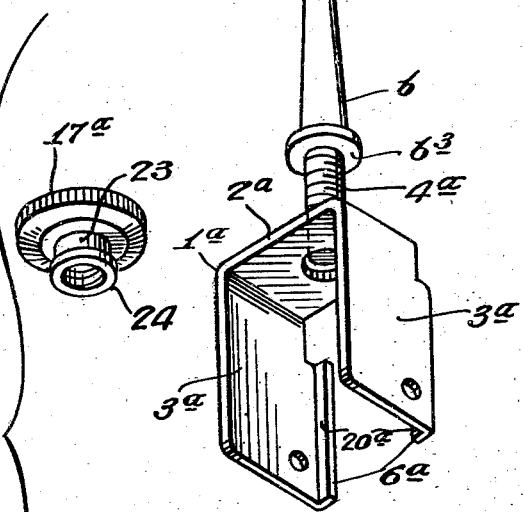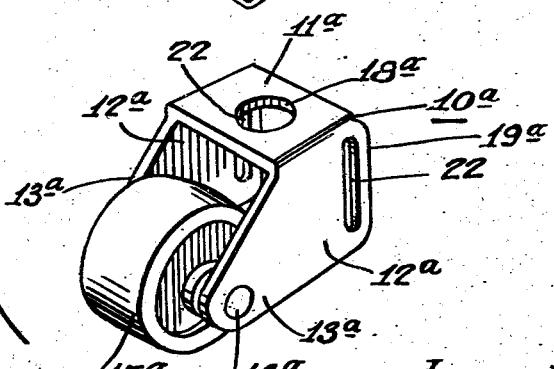

2,425,675

UNITED STATES PATENT OFFICE 2,425,675

CASTER

Benjamin P. Graff, Philadelphia, Pa., assignor to Charles R. Nalle, Philadelphia, Pa.

Application January 20, 1944, Serial No. 519,028

9 Claims. (Cl. 16—19)

This invention relates to adjustable casters for use on articles of furniture and other pieces of equipment of various kinds which are apt to be placed on uneven floors, or partly on the floor and partly on a rug or other floor covering in such a manner as to leave one of the casters unsupported and hanging freely, causing the article to be unsteady and subject to rocking on two of the other casters of the four with which most articles of furniture, cabinets, etc., are usually provided.

The primary object of the present invention is to correct unsteadiness in articles of furniture etc. and to prevent destructive or annoying settling of the corner of the article at which the unsupported caster is located, which settling ultimately results in a twisting or warping of the article to such an extent that the drawers, doors, locks, etc., of the article will fail to function properly, glued joints in the article will become loosened, and the wooden framework will split or crack.

Caster structures usually comprise two essential units, namely a socket fixed to the underside of the article supported by the casters, and a caster proper which is provided with a stem removably mounted in the socket.

In the case of adjustable casters, it has been common practice to include the adjusting means in the socket part of the caster structure. This practice requires the provision of special sockets and does not lend itself to easy substitution of adjustable casters on articles already provided with the conventional non-adjustable type of caster.

One of the features of the present invention is the provision of an adjustable caster wherein the adjusting means constitutes a part of the caster proper, instead of a part of the socket; and wherein the caster proper is also provided with a stem adapted for interchangeability with the stems of conventional casters for removable insertion in the well-known sleeve type of sockets of conventional casters which may already have been applied to articles of furniture, etc.

In most adjustable casters now in use, the stem of the caster proper is provided with axially spaced annular shoulders or spiral threads with which the adjusting means in the socket cooperates to increase or decrease the effective length of the table leg or other under part of an article to which the caster is applied. As this effective length is increased, by moving the stem axially relative to the socket, the leverage between the point of contact of the floor engaging element, carried by the outer end of the stem, and the point where the stem emerges from the socket increases proportionately. Consequently, the bending moment of the stem increases as the leverage increases. In order to prevent bending of the stem, the stem must be increased in diameter but this requires a socket of larger diameter and in cases where the casters are attached to spindly legs of dressing tables, for example, such larger diametered sockets could not be used.

One feature of the present invention is to provide increased strength between the socket and the floor engaging element of the caster, without increasing the diameter of the stem or the socket, whereby an adjustable caster having a stem of the same size as that of a standard non-adjustable caster may be used interchangeably in a standard socket, without fear of bending the stem when the caster is extended relative to the socket in the heavier pieces of furniture.

Another feature of the present invention resides in providing an adjustable caster of minimum axial dimension for use on articles of boxlike constructions having relatively thin bottoms of insufficient vertical dimension to accommodate the conventional sleeve-type socket without the upper end of the socket protruding through the thin bottom of the article. Normally, in such cases, the common plate type caster is used in order to support the article with its nether surface as close as possible to the floor.

In the accompanying drawings:

Fig. 1 is a rear elevation of an adjustable caster constructed in accordance with the principles of the present invention;

Fig. 2 is a side elevation of the structure shown in Fig. 1;

Fig. 3 is a detached perspective view of the caster parts shown in Figs. 1 and 2;

Fig. 4 is a detailed view partly in section of the caster stem and an associated part of the caster;

Fig. 5 is a front elevation partly in section, illustrating the device as used in a plate type caster; and Figs. 6, 7 and 8 are views respectively corresponding to Figs. 1, 2 and 3, and illustrating a modification of the invention.

In that form of the invention shown in Figs. 1 to 4 inclusive, the complete caster structure includes a conventional sleeve type socket A, and the caster proper B.

The socket A includes the usual sleeve $a$, with a longitudinally slotted and radially contracted upper end $a1$, for entrance into a similar boring formed in the leg of a table or other article, and the usual toothed-flanged bearing plate $a2$ for contact with the surface of the article in which the boring for the sleeve $a$ is formed.

The caster proper B comprises a stem $b$ adapted to slide into the sleeve $a$. With an enlarged head $b1$ adapted to extend beyond said sleeve. The upper edge of sleeve is adapted to snap under the shoulder $b2$ of the head $b1$ to hold the stem $b$ in the sleeve $a$ against accidental displacement, but permitting withdrawal by force.

The stem $b$ is provided, below the bearing plate $a2$ of the socket A, with an annular enlargement $b3$, for contact with the underside of the socket bearing plate $a2$ and for relative rotation with respect thereto about the coinciding axes of the sleeve $a$ and stem $b$.

Secured to the underside of the annular enlargement $b3$, according to the principles of the present invention, is a rigid inverted U-shaped yoke element 1, comprising a cross or top plate member 2 and depending laterally spaced parallel leg members 3, 3.

Coaxially with the stem $b$, the stem is provided with a threaded depending stud extension 4, which projects through an opening 41 formed in the center of the top plate member 2 (see Fig. 4) and on which is threaded a jamb nut 5, by which the top or cross plate 2 is forced against and held in rigid contact with the underside of the enlargement $b3$ of the stem $b$. However, the top plate 2 may be welded, brazed, or otherwise rigidly secured to the stem $b$, if desired.

Telescoping with the rigid yoke element 1 is a relatively extensible yoke element 10, which comprises a top or cross plate member 11 and laterally spaced leg members 12, 12 which lie parallel to and adjacent the inner sides respectively of the leg members 3, 3 of the rigid yoke element 1.

The lower ends of the leg members 3, 3 of the fixed yoke element 1 are provided with inturned horizontal ears 6, 6 which slidably grip around the vertical edges of the legs 12, 12 of the relatively extensible element 10, to act as guides during relative axial movement between the telescoping yoke elements 1 and 10.

The lower ends of the legs 12, 12 of the extensible yoke element 10 are provided with laterally projecting arms 13, 13 for supporting the opposite ends respectively of an axle 14 of the caster roller or wheel 15, off center with respect to the vertical axis of the stem $b$ to effect a swiveling action of the roller.

The extensible yoke element 10 is provided with vertically extending fingers 16, 16, in the planes of the legs 12, 12 respectively, between which a knurled-edged annular adjusting nut 17 is rotatably mounted, the upper ends of the fingers 16, 16 being bent inwardly over the top of the annular adjusting nut 17 to retain the adjusting nut in definite axial relatively rotatable relation to the top or cross plate 11 of the lower telescoping element 10, whereby, as the nut 17 is rotated between said plate and said fingers, the element 10, with its roller 15, are moved axially along the threaded extension 4 of the stem $b$ to vary the effective length of the caster between the bearing plate $a2$ of the socket A and the bottom of the caster wheel 15.

At the same side of the legs 12, 12 of the extensible element 10 from which the arms 13 which support the wheel 15 project, the upper portion of the element 10 is provided with ears 19, 19 which bear against the rear edges 20, 20 of the legs 3, 3 of the rigid yoke element 1, to prevent binding of the edge of the hole 18 in the top plate 11 of the extensible element 10 against the threads on the lower portion 4 of the stem $b$, and affording two longitudinally relatively spaced points of sliding contact between the telescoping elements 1 and 10.

With the U-shaped yoke element 1 being anchored to the stem $b$ in a plane immediately adjacent the plane where the stem $b$ emerges from the sleeve $a$, the portion 4 of the stem lying below this anchorage plane is relieved of the bending strains normally applied to the stems of adjustable casters by the leverage developed between the point of contact of the caster wheel with a supporting surface and the point on the stem where the stem emerges from the socket, and as this leverage, in this instance, is applied in the plane of the legs 3, 3 and 12, 12, the planar strains set up in the legs 3, 3 are converted into torsional strains in the top or cross plate 2. Now, as the top plate 2 is clamped over a large percentage of its area between the underside of the bearing enlargement $b3$ on the stem $b$ and the top surface of the jamb nut 5, the torsional strains set up in the plate 2 tend to tilt the stem $b$ in the sleeve $a$ but, as the stem $b$ has two axially spaced transverse planes of bearing in the sleeve $a$, i. e., one at the top and one at the bottom of the sleeve, and as the sleeve is held rigidly in its boring in the article to which the caster is applied, no tilting can take place and free swiveling action of the caster wheel about the axis of the caster stem is assured.

In that form of the invention shown in Figs. 6, 7 and 8, the bearing enlargement $b3$ of the stem $b$ is spot welded to the top plate $2a$ of the rigid yoke element $1a$, and the lower front corners of the legs $3a$, $3a$ of said yoke member are connected together by a cross bar 21, which bar is located in spaced relation to and at one side of the vertical axis of the stem $b$. The front edges of the legs $3a$, $3a$ are bent inwardly to form flanges $6a$, $6a$ thereon, as clearly shown in Fig. 8.

At the opposite side of the axis of the stem $b$, the caster wheel $15a$ is rotatably mounted on an axle $14a$ which is secured in the outer free ends of arms $13a$, $13a$. These arms extend rearwardly from the legs $12a$, $12a$ of the extensible yoke element $10a$. The yoke element $10a$ is adapted for relative telescoping movement with respect to the fixed yoke element $1a$.

The legs $12a$, $12a$ of the movable yoke $10a$ are provided with vertical slots 22, 22, through which the tie rod 21 of the fixed yoke $1a$ passes, and the front edges $19a$, $19a$ of the yoke member $10a$ bear against the rear faces $20a$, $20a$ of the vertical flanges $6a$, $6a$ of the yoke member $1a$, said rod and flanges functioning as guides to prevent tilting of the movable yoke $10a$ relative to the fixed yoke $1a$ in use.

The yoke $10a$ includes a top or cross plate $11a$ which is provided with a central opening $18a$ for reception of an axially extended neck 23 depending from the knurled-edged adjusting nut $17a$. The nut $17a$ bears on the top of the cross plate $11a$ of the yoke element $10a$, and is threaded onto the depending threaded stud extension $4a$ of the stem $b$.

The lower end of the neck 23 is provided with an annular flange 24 which lies under the top or cross plate $11a$ of the movable yoke element $10a$ and maintains the nut and yoke in predetermined relation to each other against axial displacement while affording relative rotation therebetween.

The flange 24 may be formed on the end of the neck 23 after said neck has been passed through the central opening $18a$ in the top plate $11a$ of the yoke element $10a$, as by swaging, spinning, or as a separate ring spot welded, threaded, peened or otherwise fastened to the neck after assembly of the nut and the yoke.

From the above, it will be clear that by rotating the nut 17a on the threaded stud like end 4a of the stem b, the movable yoke 10a will be moved axially with respect to the fixed yoke 1a and that the tendency of the load on the wheel 15a to tilt the yoke 10a and bend the threaded end 4a of the stem is prevented by the tie rod 21 passing through the slots 22 in the legs of movable yoke 10a, and the front edges 19a of said legs bearing against the rear faces 20a of the flanges 6a on the legs 3a of the fixed yoke 1a, thus transferring the bending or tilting tendency to the legs 3a, 3a of the yoke 1a. The lateral force thus applied to the lower ends of the legs 3a, 3a is translated into a torque action in the top plate 2a of the fixed yoke 1a and as this top plate is welded to the stem b in a plane immediately adjacent the plane where the stem b has bearing in the sleeve a the possibility of the threaded stem 4a becoming bent is obviated.

In that form of the invention shown in Fig. 5, the long shank of the stem b and its enclosing socket sleeve a are replaced by a short shank or head 25 provided with an annular groove 26, for the reception of a circular edge 28 of an opening 29 in a base plate 30 which is adapted to be secured to the nether surface 31 of an article to be supported by the caster, said plate being depressed about the axis of the opening 29 to provide a recess 32 for the reception and free swiveling of the head 25, below the base plane x—x of the plate 30.

The plate 30 is adapted to be secured by bolts, screws or equivalent means 33 to a flat under surface 31 on the article to be supported by the caster.

Below the head 25 the caster structure may have the same construction as the casters shown in either Figs. 1 to 4 inclusive, or that shown in Figs. 6 to 8 inclusive. If desired, the plate 30 and the top plate of the fixed yoke secured to the stem of the caster may be provided with complementary annular grooves 34 and 35, concentric to the axis of the stem 25 and its threaded extension 4c to form a race for ball bearings 36 to facilitate free swiveling of the caster under load.

Obviously the details of construction may vary within the scope of the invention and according to the whims of individual designers without departing from the spirit of the invention, therefore only such limitations as may be dictated by the prior art should be imposed upon the appended claims which are directed to the invention in its broader aspects.

I claim:

1. An adjustable caster comprising a rotatable stem, a support for rotatably supporting said stem adapted for rigid installation on an article to be maintained by said member, a telescoping structure comprising a pair of co-axial relatively slidable elements with one of said elements affixed at one of its ends to said stem adjacent said support, a floor engaging member carried by the opposite end of the second of said elements, and actuating means for said telescoping structure located within said structure intermediate said member and said support, said telescoping means being adapted for transmitting directly to said stem in a plane immediately adjacent said support lateral strains applied to said member at a point remote to said support.

2. An adjustable caster comprising a floor engaging member, a stem, a support for said stem adapted for rigid installation on an article to be maintained by said member, a telescoping structure including one element affixed to said member, a second element affixed to said stem adjacent said support, a threaded extension on said stem located within said telescoping structure, an adjusting nut on said extension and engaging said second element, said telescoping structure being arranged for transmitting directly to said stem above said threaded extension in a plane immediately adjacent said support lateral strains applied to said member.

3. An adjustable caster comprising a pair of relatively extensible and retractable elements, a stem secured to one of said elements, a floor engaging member carried by the other of said elements, a threaded stud integrally united with one of said elements, and a nut threaded on said stud and engageable with the other of said elements for effecting relative extension and retraction of said elements intermediate said stem and said floor engaging member.

4. An adjustable caster comprising a pair of relatively extensible and retractable elements, a stem secured to one of said elements, a floor engaging member carried by the other of said elements, a threaded stud integrally formed co-axially with said stem, and an adjusting nut on said stud and engageable with the element carrying said floor engaging member for effecting extension and retraction of said member relative to said stem axially of said stem.

5. An adjustable caster comprising a pair of telescoping yoke elements including adjacently disposed cross plates and depending legs at opposite ends of the cross plates, a stem comprising a threaded end projecting through aligned openings in said cross plates intermediate said ends thereof and rigidly secured to the cross plate of one of said yoke elements, a floor engaging member carried by the legs of the second of said yoke elements, and an adjusting nut rotatably mounted on the cross plate of said second yoke element and threaded on said stem for effecting relative extension and retraction between said yoke elements.

6. An adjustable caster comprising a pair of telescoping yoke elements including adjacently disposed cross plates and depending legs at opposite ends of the cross plates, a stem comprising a threaded end projecting through aligned openings in said cross plates intermediate said ends thereof and rigidly secured to the cross plate of one of said yoke elements, a floor engaging member carried by the legs of the second of said yoke elements, an adjusting nut rotatably mounted on the cross plate of said second yoke element and threaded on said stem for effecting relative extension and retraction between said yoke elements, and guide means carried by the legs of one and cooperating with the legs of the other of said yoke elements to afford rigidity in the extended caster.

7. An adjustable caster comprising a pair of telescoping yoke elements including adjacently disposed cross plates and depending legs at opposite ends of the cross plates, a stem comprising a threaded end projecting through aligned openings in said cross plates intermediate said ends thereof and rigidly secured to the cross plate of one of said yoke elements, a floor engaging member carried by the legs of the second of said yoke elements, an adjusting nut rotatably mounted on the cross plate of said second yoke element and threaded on said stem for effecting relative extension and retraction between said yoke elements, guide means carried by the legs of one and cooperating with the legs of the other of said yoke elements to afford rigidity in the extended caster, and a socket adapted to receive a portion of said stem extending beyond said telescoping elements and affording swiveling action of the caster relative to the socket.

8. An adjustable caster comprising a U shaped member having a flat upper surface and a pair of depending flat sides in parallel spaced relation to each other, a pair of lips disposed along opposite vertical edges of the said side members, a rod supported in and joining the side members, a threaded stud integrally attached to the flat surface and extending downwardly between the side members, a second U shaped member having an upper flat surface and a pair of parallel side members adapted for slidable engagement with the sides of the first U member said side members having vertical slots for slidable cooperation with the rod, offset means on the second U member for supporting a caster wheel, and a threaded nut having an annular groove, said nut being threaded on the stud and the annular groove of the nut being turnably mounted in an aperture on the upper surface of the second U member.

9. An adjustable caster constructed in accordance with claim 8 in which the aperture in the flat surface of the second U member loosely fits in the annular groove of the nut so that all bending moment on the caster wheel is carried by the lips and the rod.

BENJAMIN P. GRAFF.

REFERENCES CITED

The following references are of record in the file of this patent:

UNITED STATES PATENTS

| Number | Name | Date |
| --- | --- | --- |
| 1,491,204 | Epting | Apr. 22, 1924 |
| 2,339,577 | Nalle | Jan. 18, 1944 |
| 1,162,627 | McAllister | Nov. 30, 1915 |
| 104,201 | Reagan | June 14, 1870 |
| 2,034,509 | De Haven | Mar. 17, 1936 |
| 1,229,831 | Von Der Lin | June 12, 1917 |
| 37,008 | Riley | Nov. 25, 1862 |